(12) United States Patent
Jennings, III et al.

(10) Patent No.: US 8,788,573 B2
(45) Date of Patent: Jul. 22, 2014

(54) METHOD AND APPARATUS FOR EFFICIENTLY EXPANDING A P2P NETWORK

(75) Inventors: Raymond B. Jennings, III, Ossining, NY (US); Jason D. LaVoie, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 404 days.

(21) Appl. No.: 12/164,979

(22) Filed: Jun. 30, 2008

(65) Prior Publication Data

US 2008/0270539 A1 Oct. 30, 2008

Related U.S. Application Data

(63) Continuation of application No. 11/084,971, filed on Mar. 21, 2005, now abandoned.

(51) Int. Cl.
*G06F 15/16* (2006.01)

(52) U.S. Cl.
USPC ........... 709/203; 709/204; 709/218; 709/223; 709/224; 709/231

(58) Field of Classification Search
USPC .................. 709/203, 204, 218, 223–224, 231
See application file for complete search history.

(56) References Cited

U.S. PATENT DOCUMENTS

| | | | |
|---|---|---|---|
| 5,115,433 A | 5/1992 | Baran et al. | |
| 5,222,242 A * | 6/1993 | Choi et al. | 709/227 |
| 6,205,481 B1 | 3/2001 | Heddaya et al. | |
| 7,065,579 B2 * | 6/2006 | Traversat et al. | 709/230 |
| 7,263,560 B2 * | 8/2007 | Abdelaziz et al. | 709/238 |
| 7,327,683 B2 * | 2/2008 | Ogier et al. | 370/236 |
| 7,471,679 B2 * | 12/2008 | Lee | 370/390 |
| 7,571,251 B2 * | 8/2009 | Bowman | 709/242 |
| 7,668,146 B2 * | 2/2010 | Levendel et al. | 370/338 |
| 7,720,006 B1 * | 5/2010 | Yadav | 370/255 |
| 2002/0150099 A1 * | 10/2002 | Pung et al. | 370/390 |
| 2002/0181472 A1 * | 12/2002 | Horikawa | 370/395.54 |
| 2003/0041141 A1 | 2/2003 | Abdelaziz et al. | |

(Continued)

FOREIGN PATENT DOCUMENTS

| | | |
|---|---|---|
| JP | 2004021770 A | 1/2004 |
| JP | 2004246552 A | 9/2004 |

OTHER PUBLICATIONS

Lindemann, C. et al., "A distributed Search Service for Peer-to-peer File Sharing in Mobile Applications", Peer-to-peer Computing, 2002. (P2P 2002). Proceedings Second International Conference dated Sep. 5-7, 2002 Piscataway, NJ, USA, IEEE Sep. 5, 2002, pp. 73-80.

(Continued)

*Primary Examiner* — Rupal Dharia
*Assistant Examiner* — Van Kim T Nguyen
(74) *Attorney, Agent, or Firm* — Louis Percello

(57) ABSTRACT

One embodiment of the present method and apparatus for efficiently expanding a P2P network includes receiving a search request message from a requesting node and sending a response message to the requesting node on behalf of a node that has the requested data, where the response message originates at an intermediate node. The intermediate node may respond on behalf of the "responding" node, for example, in cases where the responding node is too far away from the requesting node to receive the search request message.

20 Claims, 3 Drawing Sheets

(56) References Cited

U.S. PATENT DOCUMENTS

| | | | |
|---|---|---|---|
| 2003/0114787 A1* | 6/2003 | Gura | 604/29 |
| 2003/0126122 A1* | 7/2003 | Bosley et al. | 707/3 |
| 2004/0054723 A1* | 3/2004 | Dayal et al. | 709/204 |
| 2004/0246975 A1 | 12/2004 | Joshi | |
| 2005/0021725 A1* | 1/2005 | Lobbert | 709/223 |
| 2005/0027821 A1* | 2/2005 | Alexander et al. | 709/218 |
| 2005/0050028 A1* | 3/2005 | Rose et al. | 707/3 |
| 2005/0080846 A1* | 4/2005 | McCleskey et al. | 709/202 |

OTHER PUBLICATIONS

Yunhao, L. et al., "Location-aware Topology Matching in P2P Systems", Infocom 2004., Twenty-Third Annual Joint Conference of the IEEE Computer and Communications Societies, Hong Kong, PR China, Mar. 7-11, 2004, Piscataway, NJ, USA, IEEE, vol. 4, Mar. 7, 2004, pp. 2220-2230.

Chen W. et al., "Distributed Caching and Adaptive Search in Multilayer P2P Networks", Distributed Computing Systems, 2004 Proceedings 24$^{th}$ International Conference on Hachioji, Tokyo, Japan Mar. 24-26, 2004, Piscataway, NJ, USA, IEEE, Mar. 24, 2004, pp. 219-226.

PCT International Search Report, Date of mailing Jul. 14, 2006, pp. 1-5.

Network Magazine, Feb. 2005, consists of 10 pages.

* cited by examiner

METHOD AND APPARATUS FOR EFFICIENTLY EXPANDING A P2P NETWORK

CROSS REFERENCE TO RELATED APPLICATIONS

This application is a continuation of co-pending U.S. patent application Ser. No. 11/084,971, filed Mar. 21, 2005, now abandoned entitled "METHOD AND APPARATUS FOR EFFICIENTLY EXPANDING A P2P NETWORK", which is herein incorporated by reference in its entirety.

BACKGROUND

The present invention relates generally to computing networks and relates more particularly to the expansion of peer-to-peer data transfer networks.

FIG. 1 is a schematic diagram of a network 100 of nodes (e.g., computing devices) interacting in a peer-to-peer (P2P) manner. Generally, a requesting node 101 sends a search message 105 (e.g., containing keywords relating to data that the requesting node 101 wishes to locate) to at least one intermediate node 111 in communication with the requesting node 101 via a peer connection. The intermediate node 111 receives the search message 105 and forwards the search message 105 to at least one additional node 111. Eventually, the search message 105 reaches at least one responding node 103 having the requested data (in some cases, the first intermediate node 111 to which the search message 105 is forwarded will also be a responding node 103). At least one responding node 103 then sends a response message 107 back to the requesting node 101, e.g., via the intermediate node 111. The requesting node 101 then requests the relevant data from a responding node 103 by connecting directly to the responding node 103, e.g., via direct connection 109.

In conventional P2P systems, messages including the search message 105 and the response message 107 have a limited time to live or hop count. That is, a message will expire once it has been forwarded to a predefined maximum number of nodes 101, 103 or 111. Thus, if the requesting node 101 generates a second search message having a time to live of four, and a node at which the requested data resides (e.g., node 113) is more than four "hops" away from the requesting node 101, the second search message will expire before the requested data is obtained. This problem can be reduced by increasing the search message's time to live or by increasing a number of peer connections per node; however, either will cause an increase in network traffic (the former increase being exponential due to the fan out nature of the network 100).

Thus, there is a need in the art for a method and apparatus for efficiently expanding a P2P network.

SUMMARY OF THE INVENTION

One embodiment of the present method and apparatus for efficiently expanding a P2P network includes receiving a search request message from a requesting node and sending a response message to the requesting node on behalf of a node that has the requested data, where the response message originates at an intermediate node. The intermediate node may respond on behalf of the "responding" node, for example, in cases where the responding node is too far away from the requesting node to receive the search request message.

BRIEF DESCRIPTION OF THE DRAWINGS

So that the manner in which the above recited embodiments of the invention are attained and can be understood in detail, a more particular description of the invention, briefly summarized above, may be obtained by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

In one embodiment, the present invention is a method and apparatus for efficiently expanding a P2P network. Embodiments of the present invention make it possible for a requesting node on a P2P network to receive data from nodes that would normally be outside of the requesting node's "range" by enabling intermediate nodes to respond "by proxy" for the out-of-range nodes.

Figure 1:
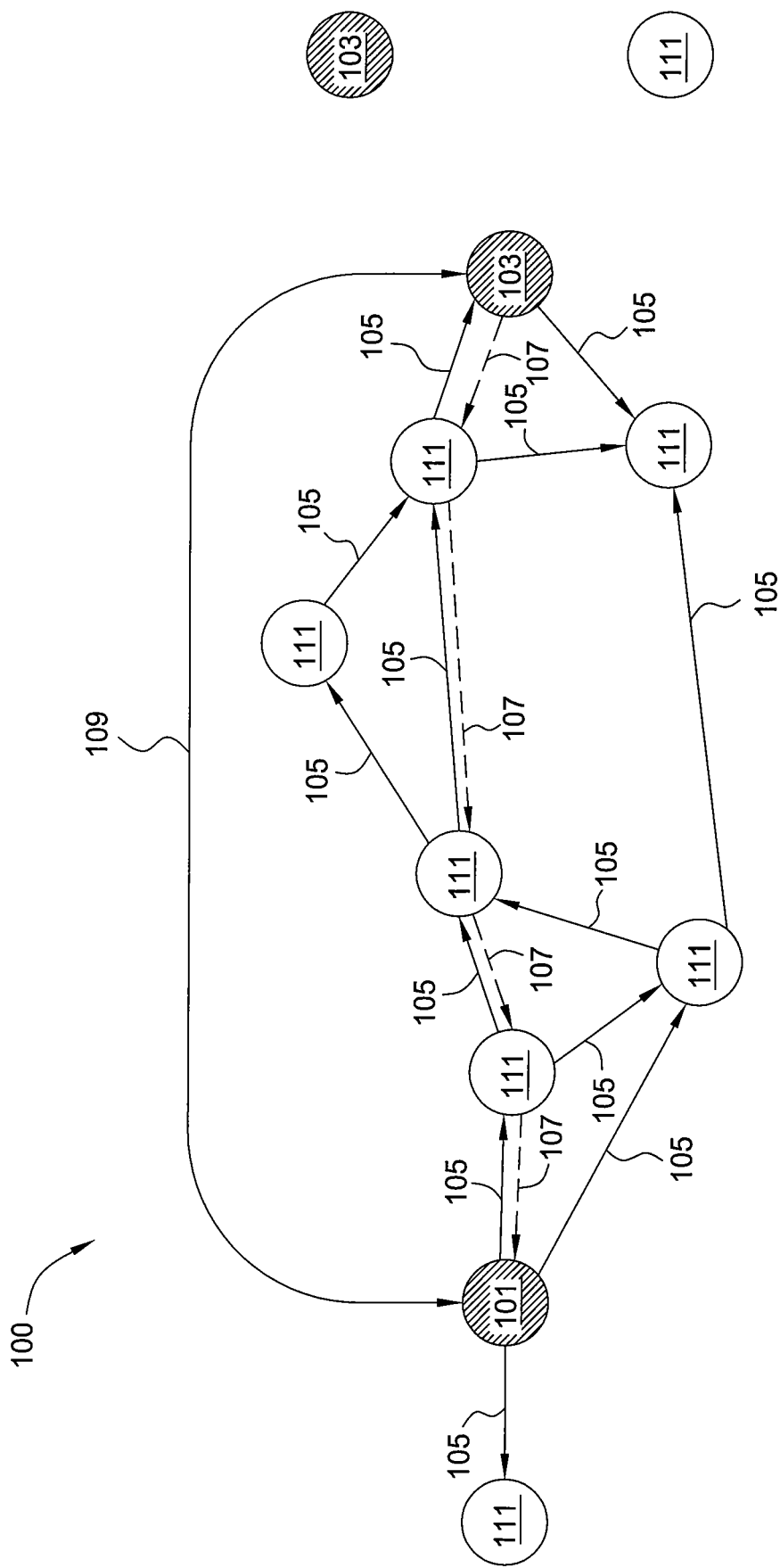
FIG. 1 is a schematic diagram of a network of nodes interacting in a peer-to-peer manner.
Figure 2:
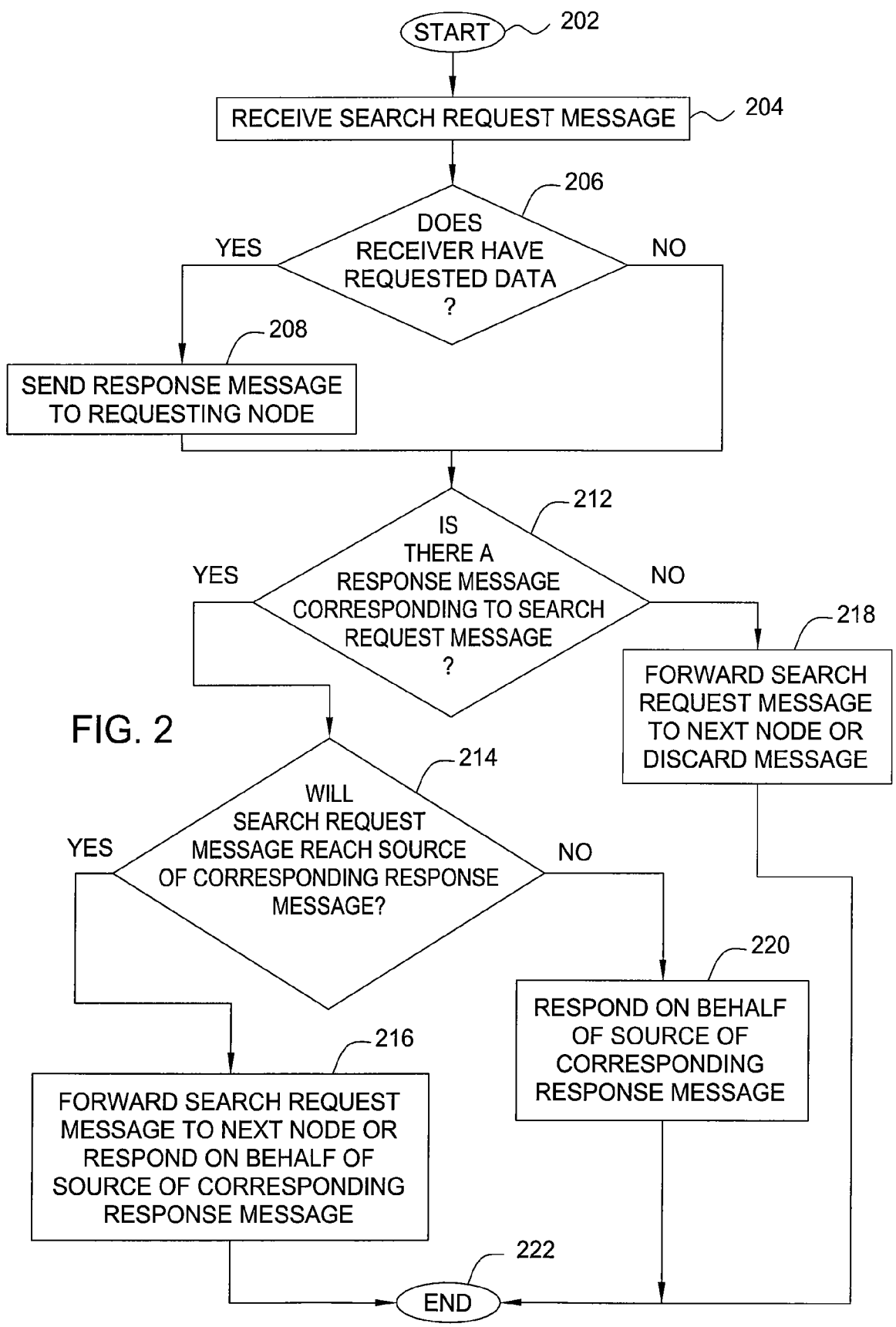
FIG. 2 is a flow diagram illustrating one embodiment of a method for efficiently expanding a P2P network, such as the network illustrated in FIG. 1.

FIG. 2 is a flow diagram illustrating one embodiment of a method 200 for efficiently expanding a P2P network, such as the network 100 illustrated in FIG. 1. The method 200 may be implemented at, for example, any node (e.g., 101, 103, 111 or 113) on the P2P network 100. The method 200 is initialized at step 202 and proceeds to step 204, where the method 200 receives a search request message, e.g., from a peer (connected) node.

The method 200 then proceeds to step 206, where the method 200 examines the search request message and determines whether the receiver (e.g., the node at which the search request message was received in step 204) has the requested data. If the receiver has the requested data, the method 200 proceeds to step 208 and sends a response message over the network 100 back to the requesting node, e.g., in accordance with conventional P2P protocols. The method then proceeds to step 212 and checks a local database for other data potentially matching the search request message, as described in further detail below.

Alternatively, if the method 200 determines in step 206 that the receiver does not have the requested data, the method 200 proceeds directly to step 212 and checks a local database residing at the receiver. The database that is checked in step 212 comprises at least one entry containing information about a previous data transfer executed on the network 100 (e.g., in which data was transferred from a responding node to a requesting node). In one embodiment, this information includes at least one of a transferred data name, a description of the contents of the transferred data, the size of the transferred data, the type of data (e.g., an image file, and audio file, etc.), the time of the data transfer, a source of the transferred data (e.g., the network ID, address, port number or other form of identification for the responding node for the transfer), a number of hops separating the receiver from the responding node, or other meta data related to the response message sent prior to the actual transfer of data.

In one embodiment, the receiver saves the information about the previous data transfers from incoming response messages sent prior to the actual transfers of data. In particular, the receiver saves as much information from the response messages as is necessary to reconstruct the response messages as proxy responses, as described in further detail below. In some embodiments, all data contained in the response messages is saved. In this embodiment, the information saved in the database for a particular previous data transfer could be the entire response message corresponding to the data transfer.

In particular, in step 212, the method 200 determines whether there is an entry (e.g., a response message) in the database that matches or corresponds to the data requested in the search request message. Specifically, the method 200 determines whether the database includes an entry that indicates at least one node in the network 100 that has the requested data (e.g., the node may have responded to a previous request for the same data that is presently being requested). If no such database entry exists, the method 200 proceeds to step 218 and either forwards the search request message to the next node (e.g., if the search request message's time to live field has not yet expired), or discards the search request message (e.g., if the time to live field expired upon transmission to the receiver in step 204).

Alternatively, if the method 200 determines in step 212 that the database does contain an entry that corresponds to the data requested in the search request message, the method 200 proceeds to step 214 and further determines whether the search request message will reach the source of the corresponding database entry (e.g., the node that presumably has the requested data). In one embodiment, the method 200 examines the search request message's time to live field (which specifies how many more hops the search request message can make) or hop count field (which specifies how many hops have been made so far) and determines how far into the network the search request message will travel (e.g., what is the furthest node that the search request message will reach?). Thus, if the search request message can make x more hops, and if the source of the corresponding database entry is at least x+1 more hops from the receiver, the method 200 assumes that the search request message will not reach the source of the corresponding database entry.

If the method 200 determines in step 214 that the search request message will not reach the source of the corresponding database entry, the method 200 proceeds to step 220 and responds on behalf of the source of the corresponding database entry, e.g., as a proxy. In one embodiment, the method 200 responds on behalf of the source of the corresponding database entry by sending a response message from the receiver to the requesting node. The response message indicates that the source of the corresponding database entry has the data for which the requesting node is searching.

Alternatively, if the method 200 determines in step 214 that the search request message will reach the source of the corresponding database entry, the method 200 may do one of two things. In one embodiment, the method 200 simply forwards the search request message to the next node, e.g., in accordance with conventional P2P protocols.

In another embodiment, the method 200 may, in step 216, respond to the search request message on behalf of the source of the corresponding database entry even though the search request message will likely still reach source of the corresponding database entry. In this case, the method 200 may also discard the search request message (i.e., not forward the search request message further through the network) once the method 200 has responded to the requesting node. Responding on behalf of the source of the corresponding database entry in this case may be desirable to achieve faster responses to search request messages (e.g., a response is generated at an earlier node in the transmission path) or to reduce network traffic (e.g., by preventing the search request message from traveling further in the network once the source of the corresponding database entry has been identified). These benefits may be especially desirable in cases where a single, finite response is all that is needed to respond to a request for data (e.g., such as a query for a stock price).

The method 200 terminates in step 222. Those skilled in the art will appreciate that in some embodiments, the method 200 may actually execute in its entirety at the requesting node. That is, if the requesting node maintains its own database of previous response messages, the requesting node may, in fact, be able to identify a node that has the requested data simply by searching its own database in accordance with steps 210-222.

The method 200 as described above enables efficient expansion of P2P networks while only minimally increasing network traffic. By enabling one or more nodes in a P2P network to respond "by proxy" for other nodes in the network, the search space for a data request is effectively increased without actually sending the data request to additional nodes. Thus, unlike conventional P2P expansion methods that tend to result in a sometimes exponential increase in network traffic (e.g., by increasing either a search request message's time to live or a node's number of peer connections), the method 200 actually conserves traffic while at the same time "expanding" the network.

Those skilled in the art will appreciate that a node's database for storing information related to previous data transfers may be built according to a variety of criteria. For example, in one embodiment, a node may automatically save information every time a response message is received. In other embodiment, parameters such as available memory or storage, network bandwidth speed, network bandwidth utilization or a length of time for which the responding node has been active in the network may dictate whether a corresponding entry will be saved in the database. In further embodiments, the node may compare the received response message to existing database entries and create an entry for the received response message only if an entry does not already exist for the data to which the response message relates. Alternatively, if a database entry already exists for the relevant data, the received response message may be used to update information for the data (e.g., by creating a list of nodes that have the data or file).

Moreover, a database may be maintained based on a variety of criteria. For example, a node may specify that database entries will be kept according to a sliding time window (e.g., where information relating to only a fixed number of the most recent search responses is saved), a fixed number of the most or least popular data searches, or a length of time in which a responding node has been active in the network (e.g., a node may keep a subset of search response information for a number of responding nodes that have been active for the longest period of time).

In order to ensure the continued validity of database entries, a node may periodically query other nodes whose response messages have been entered in the database, e.g., to ensure that the nodes still have the relevant data. Alternatively, a responding node can assist in the management of database entries by adding a field to the response message that indicates for how long the search results will be valid (e.g., "This section of the live video stream will only be available for one day."), or that indicates for how long the responding node has been active in the network.

In some embodiments, a requesting node may specify that it does not wish to receive proxy responses on behalf of out-of-range nodes (e.g., by stating so in the search request message). For example, the requesting node may expect to have its search satisfied by a nearby node (e.g., within a certain range). Alternatively, a requesting node may specify a hop count past which proxy responses are allowed (e.g., "No proxy responses until the nth hop."), so that the closest peer nodes do not send proxy responses. Furthermore, the requesting node may set an age limit for proxy responses (e.g., "No proxy responses referring to database entries that are older than n days."), in order to ensure the validity of proxy responses.

Conversely, a responding node may specify that it does not wish to have information concerning its response message saved (e.g., by stating so in the response message). For example, the responding node may want to limit its communication to only nearby nodes. Alternatively, the responding node may specify given points along the response message path at which information concerning the response message can be saved (e.g., "No saving past the n h hop."), so that the only nodes within a certain range can save information concerning the response message.

Figure 3:
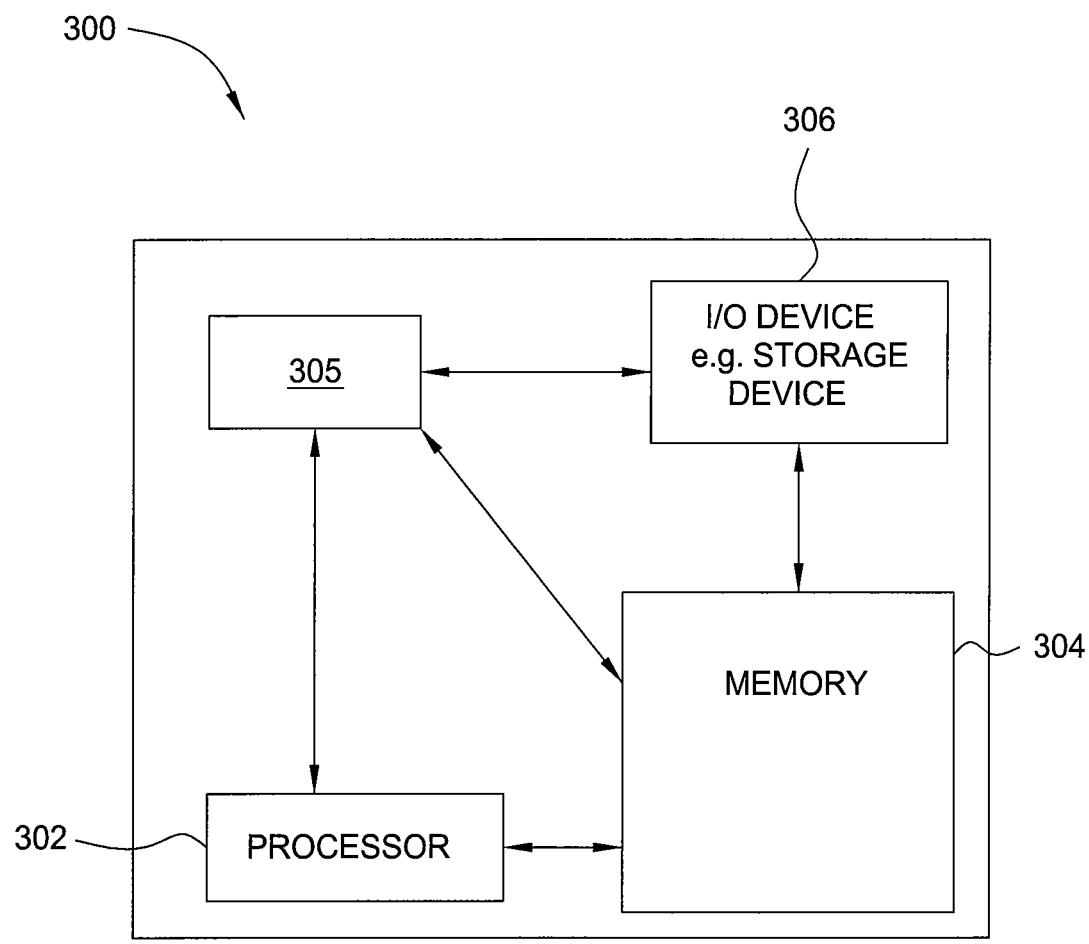
FIG. 3 is a high level block diagram of the network expansion method that is implemented using a general purpose computing device.

FIG. 3 is a high level block diagram of the network expansion method that is implemented using a general purpose computing device 300. In one embodiment, a general purpose computing device 300 comprises a processor 302, a memory 304, a data transfer module 305 and various input/output (I/O) devices 306 such as a display, a keyboard, a mouse, a modem, and the like. In one embodiment, at least one I/O device is a storage device (e.g., a disk drive, an optical disk drive, a floppy disk drive). It should be understood that the data transfer module 305 can be implemented as a physical device or subsystem that is coupled to a processor through a communication channel.

Alternatively, the data transfer module 305 can be represented by one or more software applications (or even a combination of software and hardware, e.g., using Application Specific Integrated Circuits (ASIC)), where the software is loaded from a storage medium (e.g., I/O devices 306) and operated by the processor 302 in the memory 304 of the general purpose computing device 300. Thus, in one embodiment, the data transfer module 305 for efficiently expanding a P2P network described herein with reference to the preceding Figures can be stored on a computer readable medium or carrier (e.g., RAM, magnetic or optical drive or diskette, and the like).

Thus, the present invention represents a significant advancement in the field of data transfer networks. A method and apparatus are provided that make it possible for a requesting node on a P2P network to receive data from nodes that would normally be outside of the requesting node's range by enabling intermediate nodes to respond by proxy for the out-of-range nodes. Moreover, unlike conventional methods for expanding P2P networks, the method and apparatus of the present invention actually conserve network traffic while effectively expanding the search space for data requests.

While foregoing is directed to the preferred embodiment of the present invention, other and further embodiments of the invention may be devised without departing from the basic scope thereof, and the scope thereof is determined by the claims that follow.

The invention claimed is:

1. A method for transferring data from a first node to a second node in a network, said method comprising steps of:
   receiving, at a third node in the network, a search request message originating from said second node, said search request message requesting the data;
   determining, by the third node, that the first node has the data and that the search request message will not reach the first node; and
   sending, by the third node, a response message to said second node said response message indicating that said first node has the data, wherein said sending comprises:
      locating information related to said data in a database associated with said third node, where said database includes at least one entry comprising information taken from a prior response message received by said third node in connection with a prior transfer of said data, the prior response message including a dedicated field that explicitly indicates a length of time for which said data will be available at said first node; and
      constructing said response message using said information taken from said prior response message, wherein said information taken from said prior response message comprises at least one of: a name of said data, a description of content of said data, a size of said data, a type of said data, a time of said prior transfer of said data, a number of hops separating said third node from said first node, meta data related to said prior response message, a source of said data, or said prior response message,
   wherein the search request message specifies that the response message must come from a source of the data unless a hop count of the search request message has reached a specified value, and wherein the search request message further specifies that the response message is permitted to come from a node other than the source of the data when the hop count reaches the specified value, and
   wherein at least one of: the receiving, the determining, or the sending is performed using a processor.

2. The method of claim 1, where said prior response message originated at said first node.

3. The method of claim 1, wherein said information related to said data is automatically saved in said database for every response message received by said third node.

4. The method of claim 1, wherein said information related to said data is saved based on at least one of: available database memory, available database storage, network bandwidth speed, network bandwidth utilization, or a length of time for which said first node has been active on said network.

5. The method of claim 1, wherein said method is executed at said second node.

6. The method of claim 1, wherein the third node receives the search request message from a fourth node that is different from the first node and the second node.

7. The method of claim 1, wherein said third node is an intermediate node located between said first node and second node.

8. The method of claim 1, wherein the determining comprises:
   examining a time to live field or a hop count field of said search request message to determine how far in said network said search request message will travel; and
   concluding that said time to live field or hop count field will expire before the search request message reaches the first node.

9. The method of claim 1, wherein a time period for keeping said at least one entry in said database is dictated by at least one of: a fixed number of most recent data transfers, a fixed number of most popular responses, a fixed number of least popular data responses, or a length of time for which said first node has been active in said network.

10. The method of claim 1, wherein the prior response message indicates a length of time for which said first node has been active in said network.

11. The method of claim 1, wherein the search request message specifies that the at least one entry must be no older than a defined age in order for the information to be included in said response message.

12. A non-transitory computer readable storage device containing an executable program for transferring data from a first node to a second node in a network, where the program performs steps of:
receiving, at a third node in the network, a search request message originating from said second node, said search request message requesting the data;
determining, by the third node, that the first node has the data and that the search request message will not reach the first node; and
sending, by the third node, a response message to said second node, said response message indicating that said first node has the data, wherein said sending comprises:
locating information related to said data in a database associated with said third node, where said database includes at least one entry comprising information taken from a prior response message received by said third node in connection with a prior transfer of said data, the prior response message including a dedicated field that explicitly indicates a length of time for which said data will be available at said first node; and
constructing said response message using said information taken from said prior response message, wherein said information taken from said prior response message comprises at least one of: a name of said data, a description of content of said data, a size of said data, a type of said data, a time of said prior transfer of said data, a number of hops separating said third node from said first node, meta data related to said prior response message, a source of said data, or said prior response message,
wherein the search request message specifies that the response message must come from a source of the data unless a hop count of the search request message has reached a specified value, and wherein the search request message further specifies that the response message is permitted to come from a node other than the source of the data when the hop count reaches the specified value.

13. The non-transitory computer readable storage device of claim 12, where said prior response message originated at said first node.

14. The non-transitory computer readable storage device of claim 12, wherein said information related to said data is automatically saved in said database for every response message received by said third node.

15. The non-transitory computer readable storage device of claim 12, wherein said information related to said data is saved based on at least one of: available database memory, available database storage, network bandwidth speed, network bandwidth utilization, or a length of time for which said first node has been active on said network.

16. The non-transitory computer readable storage device of claim 12, wherein said program is executed at said second node.

17. The non-transitory computer readable storage device of claim 12, wherein said third node is an intermediate node located between said first node and second node.

18. The non-transitory computer readable storage device of claim 12, wherein the determining comprises:
examining a time to live field or a hop count field of said search request message to determine how far in said network said search request message will travel; and
concluding that said time to live field or hop count field will expire before the search request message reaches the first node.

19. The non-transitory computer readable storage device of claim 12, wherein a time period for keeping said at least one entry in said database is dictated by at least one of: a fixed number of most recent data transfers, a fixed number of most popular responses, a fixed number of least popular data responses, or a length of time for which said first node has been active in said network.

20. Apparatus comprising:
for an input device for receiving, at a third node in the network, a search request message originating from said second node, said search request message requesting the data;
a processor for determining, by the third node, that the first node has the data and that the search request message will not reach the first node;
an output device for sending, by the third node, a response message to said second node, said response message indicating that said first node has the data; and
a database associated with said third node, where said database includes at least one entry comprising information taken from a prior response message received by said third node in connection with a prior transfer of said data, the prior response message including a dedicated field that explicitly indicates a length of time for which said data will be available at said first node,
wherein the processor additionally locates information related to said data in said database,
wherein the output device additionally constructs said response message using said information taken from said prior response message, wherein said information taken from said prior response message comprises at least one of: a name of said data, a description of content of said data, a size of said data, a type of said data, a time of said prior transfer of said data, a number of hops separating said third node from said first node, meta data related to said prior response message, a source of said data, or said prior response message, and
wherein the search request message specifies that the response message must come from a source of the data unless a hop count of the search request message has reached a specified value, and wherein the search request message further specifies that the response message is permitted to come from a node other than the source of the data when the hop count reaches the specified value.

* * * * *